…

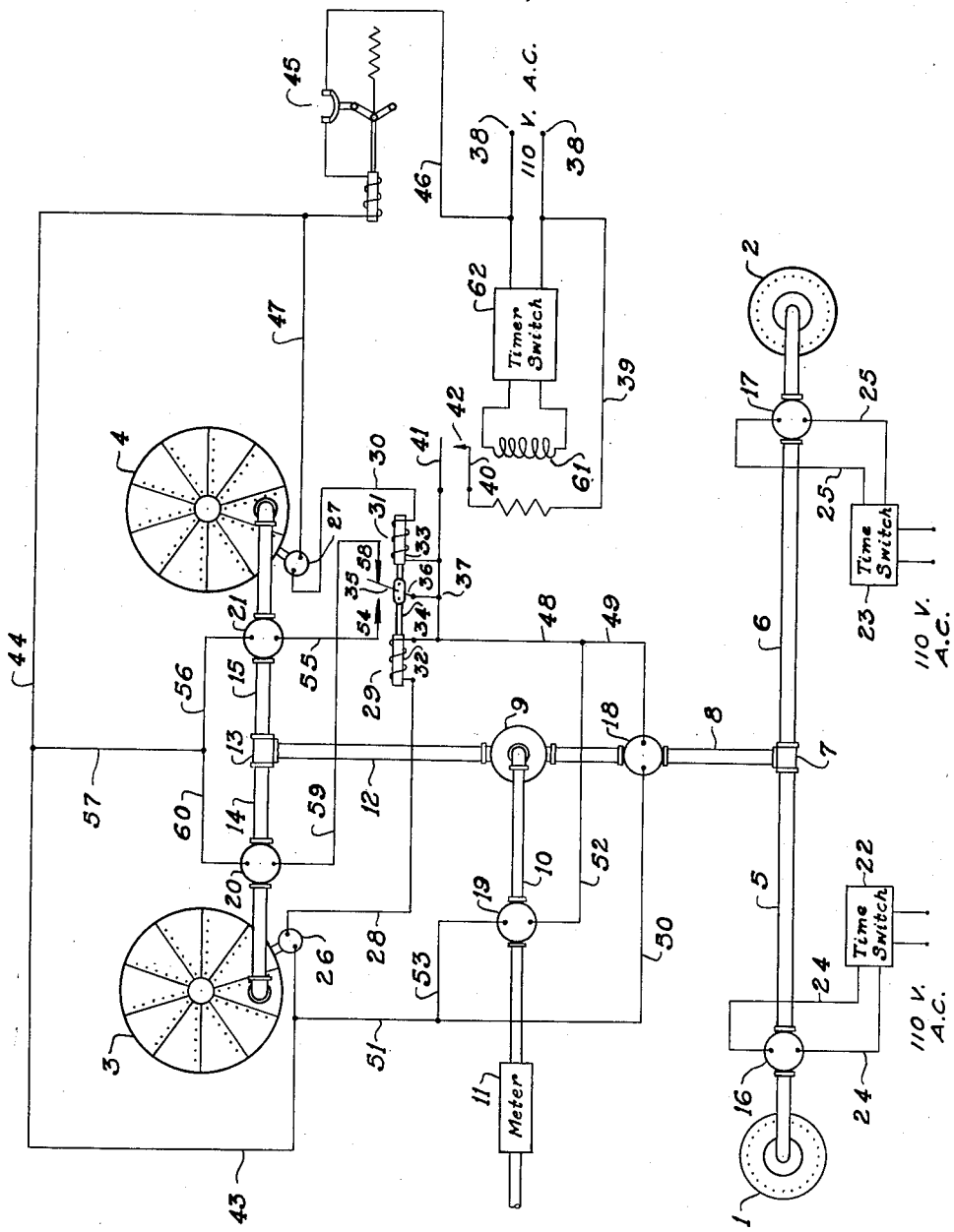

UNITED STATES PATENT OFFICE 2,572,621

ELECTRICALLY CONTROLLED VALVE MEANS

Richard P. Hobson, Longview, Tex., assignor to The Atlantic Refining Company, Philadelphia, Pa., a corporation of Pennsylvania Application December 4, 1948, Serial No. 63,489

4 Claims. (Cl. 137—68)

This invention relates to a system for controlling fluid flow in pipes and more particularly relates to a system for automatically, selectively flowing production from a well through flow pipes into a series of tanks.

It is the usual practice to flow the production from a well or wells through a flow pipe system to a separator, wherein the production is stabilized, and thence, to one or more of the tanks making up a tank battery. The pipe system is provided with necessary control valves for diverting the flow of production to any one or more of the tanks.

Heretofore it has been necessary to make frequent checks on such operations and, when it is determined that the fluid in one of the tanks has reached a desired level, to operate manually the appropriate valves to direct flow of production into an empty or partially empty tank. Since the fluid stored in the tanks is withdrawn at irregular intervals and in varying quantities, it has been necessary also to have available current information on the amount of fluid in each of the tanks so that the flow of production can be diverted into an empty tank when one of the tanks becomes filled. This information has been obtained in the past by making frequent measurements of the height of the liquid in each of the tanks. Obviously, such a system requires close surveillance of the operation to avoid overflow of the tanks. Further, considerable time is expended in determining the fluid levels in the various tanks, and in operating manually the flow valves as necessary.

Accordingly, one object of this invention is to provide a system for automatically and selectively flowing production from a well or wells into a series of tanks.

Another object is to provide such a system whereby the flow of production will be diverted from one tank into another empty tank when the fluid in the first tank reaches a preselected level.

A further object is to provide such a system whereby all flow of production will be interrupted automatically upon all of the tanks becoming filled.

Other objects and features of the invention will be apparent from the drawing and description which follow.

The drawing is a diagrammatic view, with the electrical circuits shown schematically, of a system constructed in accordance with the invention.

Referring to the drawing, numerals 1 and 2 denote generally wells, the production from which is conducted through a system of flow pipes into one or more of the tanks, such as, tanks 3 and 4, making up a tank battery. The system of pipes includes flow lines 5 and 6 which are connected to the well heads of wells 1 and 2, respectively. The other ends of lines 5 and 6 are connected by means of T coupling 7, for example, to flow line 8 which communicates at its other end with a conventional separator 9 for separating from the production entering thereinto undesirable, normally gaseous components. Flow line 10 is connected to separator 9, and functions to conduct the separated gas from separator 9 either to a suitable storage or to a gas operated device, neither of which is shown, as desired. A meter 11 may be provided in line 10 for measuring the quantity of gas passed from the separator. Dump line 12 is connected at one of its ends to the stabilized production or liquid outlet of separator 9, and terminates at its other end in T coupling 13 to which are threaded, or otherwise secured, flow lines 14 and 15 which terminate, preferably, in the top of and communicate with the interior of tanks 3 and 4, respectively.

Lines 5, 6, 8, 10, 14, and 15 are provided, respectively, with valves 16, 17, 18, 19, 20, and 21 for controlling the flow of fluid therein, the valves, preferably, being conventional magnetic gate valves typical of such devices commonly used in the industry for controlling fluid flow in pipes. Since magnetic gate valves are well known and in common use, a description of the construction and operation thereof will be unnecessary other than to point out that such valves are adapted to open and permit fluid flow therethrough upon the application thereto of a suitable energizing current, and to return to their normally closed position upon interruption of the applied current.

Regulatory laws of many States frequently permit only limited production daily from certain producing zones. Further, in the case of thin oil columns it is the usual practice to flow periodically oil from a well communicating with the oil zones in relatively small quantities to prevent channeling of adjacent gas and water, or either, as the case may be. In view of the above, it may be desirable to employ automatic time switches 22 and 23 for controlling the application of energizing current to valves 16 and 17, respectively. Time switches are conventional devices and comprise a switch and mechanism adapted to automatically and periodically close the switch at preselected time intervals and for given times. It is seen that by proper adjustment of time switches 22 and 23 energizing current may be applied from a suitable source, not shown, to valves 16 and 17 through leads 24 and 25, respectively, whereby the valves will be caused to operate in a manner to permit flow of production therethrough from wells 1 and 2 in desired quantities and at selected time intervals. It is obvious that one of the wells may be permitted to flow while the other well is shut down.

It is the purpose of the invention to provide means for controlling automatically the operation of magnetic gate valves 18, 19, 20, and 21 in a manner so as to obtain selective flow of fluid from wells 1 and 2 into tanks 3 and 4. To this end there are provided in the wall and, preferably, adjacent the top of tanks 3 and 4, respectively, mercury float switches 26 and 27 which may be any one of a number of such switches commonly employed for closing automatically an electric circuit when the fluid in a container, with which the switch is employed has reached a preselected level. Float switch 26 is directly connected by lead 28 to solenoid 29, and in a similar manner float switch 27 is connected by lead 30 to solenoid 31. Plungers 32 and 33 of solenoids 29 and 31, respectively, are joined by mechanical linkage 34 through which operatively extends, as at 35, moving contact 36 of a solenoid operated relay, generally denoted by numeral 37, the construction and operation of the relay being described more fully hereinafter.

An alternating current source, not shown, may be employed for supplying actuating current to solenoid 29 connected in an electric circuit which is controlled by float switch 26 and includes input terminals 38, lead 39, contacts 40 and 41 of relay 42, described hereinafter, solenoid 29, lead 28, float switch 26, leads 43 and 44, circuit breaker 45, and lead 46. Actuating current also is supplied from the alternating current source to solenoid 31 connected in a similar electric circuit which is controlled by float switch 27 and includes terminals 38, lead 39, contacts 40 and 41, solenoid 31, lead 30, float switch 27, lead 47, circuit breaker 45, and lead 46.

In addition, the alternating current source supplies the energizing current for operating valves 18, 19, 20, and 21. It is readily seen that an electric circuit exists from the alternating current source through contacts 40 and 41, leads 48 and 49, valve 18, leads 50, 51, 43, 44, and circuit breaker 45 back to the source. A similar circuit exists from the alternating current source through valve 19, which circuit includes contacts 40 and 41, leads 48 and 52, valve 19, leads 53, 51, 43, and 44, circuit breaker 45 and lead 46.

With contacts 40 and 41 closed, current is supplied either to magnetic valve 20 or 21, dependent upon the position of moving contact 36 of relay 37, which is controlled by solenoids 29 and 31. When moving contact 36 is in engagement with contact 54 of relay 37, a circuit is completed from the alternating current source through relay 37, lead 55, valve 21, leads 56, 57, and 44, and circuit breaker 45 back to the source. On the other hand, when moving contact 36 is in engagement with contact 58, an electric circuit is completed from the alternating current source through relay 37, lead 59, valve 20, leads 60, 57, and 44, and circuit breaker 45 back to the source.

Relay 42 is actuated by the application of current to coil 61 from the alternating current source provided across input terminals 38, the current flow being controlled by time switch 62 connected, as shown, between coil 61 and terminals 38. Time switch 62 preferably is identical with time switches 22 and 23 and may be set to operate at desired time intervals.

In operation, after the system has been assembled as shown in the drawing, time switches 22 and 23 are adjusted in a manner such that valves 16 and 17 operate at preselected times to permit desired quantities of production to flow therethrough from the associated wells. Then time switch 62 is adjusted so as to cause relay 42 to be actuated, and therefore, contacts 40 and 41 to be closed during the time that either valve 16 or 17 is open. It is understood that under these conditions when valves 16 and 17, or either, as the case may be, are open current will flow from the alternating current source through relay 42 to valves 18 and 19 whereby valves 18 and 19 also will be maintained open to permit fluid from wells 1 and 2 to flow through line 8 into separator 9, and the gas to flow from the separator through line 10 to a suitable storage.

The liquid from separator 9 flows through line 12 and thence either through line 14 into tank 3 or through line 15 into tank 4, depending upon the position of contact 36 of solenoid operated relay 37. Assuming that tank 3 is empty, or partially empty, and the liquid in tank 4 is at a preselected level, float switch 27 will be closed completing an electric circuit through its associated solenoid 31 whereby the solenoid is actuated, causing plunger 33 to move thereinto, and mechanical linkage 34 to pull moving contact 36 into engagement with contact 58 of relay 37, as shown in the drawing. When in this position, current from the current source connected across terminals 38 will flow through relay 37, contact 58, and lead 59 to magnetic valve 20 causing the valve to open, thereby permitting liquid from separator 9 to flow into tank 3.

When the liquid in tank 3 reaches a predetermined level, float switch 26 will operate completing a circuit through solenoid 29, thereby moving contact 36 into engagement with contact 54. This change in position of contact 36, interrupts current flow through valve 20 causing it to close, and also initiates current flow through valve 21 causing it to open thereby permitting liquid flow therethrough into tank 4.

It is thus seen that as the liquid in one of the tanks reaches a predetermined level the liquid flow from separator 9 is automatically and selectively directed into another empty tank. It should be pointed out that circuit breaker 45 is adjusted in a manner such that if at any time both tanks are full, the simultaneous current flow through solenoids 29 and 31 will cause the circuit breaker to drop out, interrupting energizing current flow in valves 18, 19, 20, and 21 whereby all flow of liquid in the system is automatically stopped.

I claim:

1. In a system for automatically, selectively flowing fluid from a well into a series of tanks individually connected with the well by means of flow pipes, electrically operated valve means in each of the pipes for controlling flow of fluid therein, a first electrical circuit including a current source connected with the valve means for applying energizing current thereto, relay means provided in the first circuit for selectively controlling the application of electrical current to the valve means, switch means provided in each tank and responsive to changes in fluid level therein, a second electrical circuit for actuating the relay means and connected with the switch means in a manner so that the valve means controlling the flow of fluid into one of the tanks will be closed when the fluid level in that tank reaches a selected point, and circuit interrupting means connected in the second circuit for interrupting the application of energizing current to the valve means when all of the tanks are full.

2. In a system for automatically, selectively flowing fluid from a well into a series of tanks individually connected with the well by means of flow pipes, electrically operated valve means in each of the pipes for controlling flow of fluid therein, the valve means being normally closed, a first electrical circuit including a current source connected with the valve means for applying energizing current thereto, relay means provided in the first circuit for selectively controlling the application of electrical current to the valve means, switch means provided in each tank and responsive to changes in fluid level therein, a second electrical circuit for actuating the relay means and connected with the switch means in a manner so that the valve means controlling the flow of fluid into one of the tanks will be closed when the fluid level in that tank reaches a selected point, and circuit interrupting means connected in the second circuit for interrupting the application of energizing current to the valve means when all of the tanks are full.

3. In a system for automatically, selectively flowing fluid from a well into a series of tanks individually connected with the well by means of flow pipes, electrically operated valve means in each of the pipes for controlling flow of fluid therein, the valve means being normally closed, a first electrical circuit including a current source connected with the valve means for applying energizing current thereto, relay means provided in the first circuit for selectively controlling the application of electrical current to the valve means, switch means provided in each tank and responsive to changes in fluid level therein, a second electrical circuit for actuating the relay means and connected with the switch means in a manner so that the valve means controlling the flow of fluid into one of the tanks will be closed when the fluid level in that tank reaches a selected point, and circuit interrupting means connected in the second circuit for interrupting the application of energizing current to the valve means when all of the tanks are full, the second circuit including a plurality of solenoids, each of which is connected in series with one of the switch means and positioned in operative relationship with the relay means for actuating the latter when current flows through the solenoid, and a current source for independently supplying current to each combination of switch means and solenoid.

4. In a system for automatically, selectively flowing fluid from a well into a series of tanks individually connected with the well by means of flow pipes, electrically operated valve means in each of the pipes for controlling flow of fluid therein, the valve means being normally closed, a first electrical circuit including a current source connected with the valve means for applying energizing current thereto, relay means provided in the first circuit for selectively controlling the application of electrical current to the valve means, switch means provided in each tank and responsive to changes in fluid level therein, a second electrical circuit for actuating the relay means and connected with the switch means in a manner so that the valve means controlling the flow of fluid into one of the tanks will be closed when the fluid level in that tank reaches a selected point, and circuit interrupting means connected in the second circuit for interrupting the application of energizing current to the valve means when all of the tanks are full, the second circuit including a plurality of solenoids, each of which is connected in series with one of the relay means and positioned in operative relationship with the relay means for actuating the latter when current flows through the solenoid, and the combinations of switch means and solenoid being connected in parallel across the current source.

RICHARD P. HOBSON.

REFERENCES CITED

The following references are of record in the file of this patent:

UNITED STATES PATENTS

| Number | Name | Date |
|---|---|---|
| 1,068,635 | Dunn | July 29, 1913 |
| 1,529,585 | Gameson | Mar. 10, 1925 |
| 1,962,192 | Hapgood | June 12, 1934 |
| 2,340,070 | McCauley | Jan. 25, 1944 |